March 12, 1957   R. H. EISENGREIN ET AL   2,785,318
AUTOMATIC PARALLELING CIRCUIT
Filed May 27, 1954

Inventors
Robert H. Eisengrein
Evans W. Erikson
By Schroeder, Hofgren, Brady & Wagner
Atty's

2,785,318
AUTOMATIC PARALLELING CIRCUIT

Robert H. Eisengrein and Evans W. Erikson, Rockford, Ill., assignors to Sundstrand Machine Tool Co., a corporation of Illinois Application May 27, 1954, Serial No. 432,674

10 Claims. (Cl. 307—87)

This invention relates to a means for paralleling two alternators. The general object is to provide a new and improved automatic means for safely paralleling two alternators.

Another object of this invention is to provide an automatic means for connecting one alternator in parallel with another alternator at a time when the two are approximately in phase with each other.

A further more detailed object of this invention is to provide a safe means for paralleling two alternators by throwing a switch thereby actuating a circuit which automatically cuts in the second alternator at a time when the two alternators are approximately in phase and the voltage between them is zero, to avoid causing damage to either alternator.

Other objects and advantages of the invention will become apparent from the following detailed description taken in connection with the accompanying drawings, in which.

Figure 1:
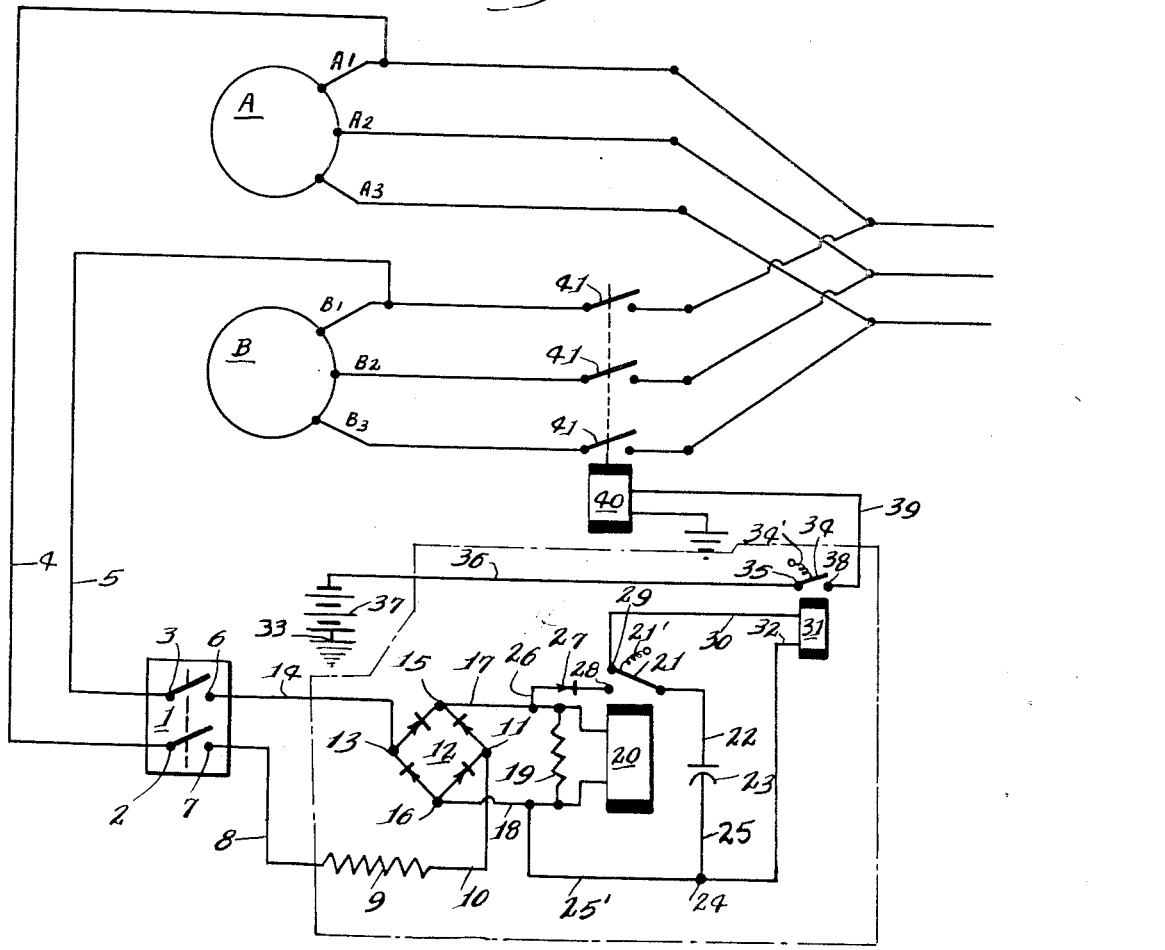
Fig. 1 is a schematic view and wiring diagram.

While the invention herein disclosed is a preferred embodiment, it is not intended to limit the invention to the specific form and arrangements shown, it being contemplated that various changes may be made by those skilled in the art without departing from the spirit and scope of the appended claims.

As illustrated in the drawing a single throw double pole manually operated switch 1 is shown with leads 4 and 5 connecting terminals 2 and 3 of switch 1 respectively to terminal A1 of one alternator A and terminal B1 of a second alternator B to be connected in parallel. A contact 7 of said switch is connected through a lead 8 to one side of a resistor 9, the other side of said resistor 9 being connected by a lead 10 to a terminal 11 of a rectifier 12, a corresponding opposite terminal 13 of said rectifier 12 being connected to a contact 6 of switch 1 by a lead 14.

Connected across the other opposite terminals 15 and 16 of rectifier 12 in parallel by leads 17 and 18 are a shunting resistor 19 and a relay 20. A movable switch member 21 of relay 20 is part of a double throw switch and is connected by a lead 22 to a condenser 23. The other side of condenser 23 is connected by leads 25 and 25' to lead 18 between terminal 16 of rectifier 12 and the resistor 19. Connected to lead 17 between the opposite end of the resistor 19 and terminal 15 of rectifier 12 through a lead 26 is a diode rectifier 27. The other side of diode rectifier 27 is connected to a normally open contact 28 so that when relay 20 is energized by a predetermined voltage, as at point E (Fig. 2), across rectifier 12, switch member 21 closes to contact 28 allowing condenser 23 to charge up through diode rectifier 27. A spring 21' normally retains switch member 21 engaged with a contact 29 of the switch.

Figure 2:
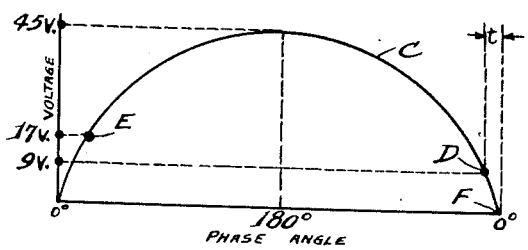
Fig. 2 is a diagram with a curve C showing the voltage between two alternators plotted against the phase angle between the two alternators.

Contact 29 of switch 21 is connected through a lead 30 to a relay 31, the other side of said relay being connected through a lead 32 to the intersection of the rectifier 12 and the condenser 23 at 24. Thus when the voltage across rectifier 12 decreases to a predetermined voltage, as at D (Fig. 2), relay 20 de-energizes allowing switch member 21 to complete a circuit between the condenser 23 and relay 31 through contact 29, thus connecting relay 31 across condenser 23, the discharge of which may energize relay 31. The energizing of a relay 31 closes switch member 34, normally held open by means of spring 34', a terminal 35 of which is connected through a lead 36 to one terminal of a 28 volt D. C. supply 37, the other terminal of which is connected to ground at 33. A normally open contact 38 is connected through a lead 39 to a circuit breaker relay 40 of the second alternator B, thereby putting 28 volts on said circuit breaker relay to close the circuit breaker relay switches 41 and parallel the two alternators at point F (Fig. 2). The circuit breaker is preferably of a well known type having a mechanical latch and a trip device therefor (not shown) so that once the relay 40 is operated electrically the switches 41 are held closed by the mechanical latch.

As to the operation of this circuit, when manually operated switch 1 is closed the voltage between corresponding terminals of the two alternators is placed across resistor 9 and rectifier 12 in series. The resultant voltage between these two phases will be a sinusoidal voltage varying from 0 volts when the two alternators are in phase to about 230 volts, or a maximum, when they are 180° out of phase. Resistor 9 is so designed that approximately ⅘ of this voltage is dropped across resistor 9. Thus the voltage across rectifier 12 is a sinusoidal voltage varying from 0 volts to about 45 volts. This is a voltage as shown by curve C in Fig. 2 across relay 20 and resistor 19.

When the voltage across relay 20 reaches about 17 volts, as shown at point E, relay 20 becomes energized, connecting the movable switch member 21 to normally open contact 28 and completing a circuit allowing condenser 23 to charge through diode rectifier 27. Relay 20 remains energized until the voltage across it decreases to about 9 volts, as shown at point D on curve C, when it becomes de-energized. During this period when relay 20 is energized, condenser 23 is prevented from discharging through relay 20 and resistor 19 by diode rectifier 27, because of its high back resistance.

When relay 20 is de-energized switch member 21 moves to contact 29, completing a circuit allowing condenser 23 to discharge through relay 31. If the difference in the speed of the two alternators is low enough and condenser 23 has had sufficient time to charge to a predetermined value, its discharge through relay 31 will energize relay 31. When relay 31 becomes energized it closes normally open switch member 34 to contact 38, putting 28 volts D. C. on the circuit breaker relay 40 of the second alternator and closes switches 41, thereby paralleling the alternators. If the difference frequency between the two alternators is not low enough condenser 23 will not have sufficient time to charge to a value that will energize relay 31 when condenser 23 discharges.

In this preferred embodiment of the invention it is contemplated that the two alternators may be driven by constant speed drives holding the alternator frequency to 400±1 cycle per second for all conditions of temperature, load, and input speed. Thus this embodiment of the invention has been designed to operate at a difference frequency of 2.5 C. P. S. or less. If the difference frequency is above 3 C. P. S. condenser 23 will not have time to charge up to a high enough value to energize relay 31 when relay 20 de-energizes. Instead relay 20 will be operating quite rapidly and condenser 23 will be charging and discharging just as rapidly through relay 31, but not energizing relay 31 as condenser 23 will not have had time to charge to the predetermined value that will energize relay 31 by its discharge. As the difference frequency between the two alternators is reduced, relay 20 will operate less rapidly allowing condenser 23 to charge to higher values until at a difference frequency of 2.5 C. P. S. or less condenser 23 will charge to such a value that its discharge will energize relay 31, putting the D. C. voltage on the circuit breaker relay and thereby paralleling the two alternators.

It is realized that the maximum difference frequency which will cause relay 31 to be actuated can be changed by varying the values of resistors 9 and 19 and condenser 23.

The delay time, $t$, as shown in Fig. 2 is preferably equal to the sum of the time constants of relay 31 and circuit breaker relay 40 and amounts to about .050 second. Point D is made to occur .050 second before point F for a difference frequency of 1 C. P. S. This is done by the proper selection of the ratio of resistor 9 to resistor 19. Thus the two alternators parallel at point F, or when they are in phase for a difference frequency of 1 C. P. S. With a difference frequency of either 0 C. P. S. or 2 C. P. S. the two alternators will parallel at about a 15° phase angle.

We claim:

1. An automatic paralleling control for a pair of alternators comprising, a manually operated paralleling switch, a full wave bridge type of rectifier having one set of opposite terminals connected to corresponding phases of an alternator in operation and an alternator to be connected in parallel with said first alternator after said manual switch is closed, the voltage between said alternators being a sinusoidal voltage with a maximum value when the two alternators are 180° out of phase and 0 volts when they are exactly in phase, a resistor in series with said rectifier capable of absorbing approximately ⅘ of said voltage, a first relay connected across the remaining set of opposite terminals of said rectifier energizable to close one set of contacts of a single pole double throw switch when said voltage across said rectifier reaches approximately 17 volts, a shunting resistance connected across the coil of said first relay, a circuit completed across said relay and resistor when said switch contacts are closed comprising a condenser in series with a diode rectifier through which said condenser is charged during the period said relay is energized, said relay becoming de-energized at a time when said voltage across said rectifier decreases to 9 volts and allowing said switch contacts to open, a second relay having a coil with one terminal thereof connected between said bridge type rectifier and said condenser and the other terminal connected to a second set of contacts of said first relay switch, said second relay being energizable by the discharge of said condenser through said second relay coil when said first relay becomes de-energized if said condenser has had time to charge to a predetermined value, said value varying inversely with the difference frequency between the two alternators, and a single pole single throw normally open switch, one terminal of which is connected to a current supply and with the other terminal connected to the relay coil of a mechanical latch type circuit breaker of the second alternator, said switch being capable of being closed by the energization of said second relay coil thereby completing a circuit connecting said current supply to the circuit breaker relay coil and paralleling the two alternators, the delay time of said second relay and said circuit breaker relay coil being equal to the time necessary for the voltage across the rectifier and between the two alternators to drop from said 9 volts to 0 volts.

2. A circuit for automatically paralleling alternators comprising, a manually operated switch, a rectifier connected by said switch to corresponding single phases of two three-phase alternators, means operable to reduce the voltage across said rectifier to ⅕ the voltage between said alternators, a relay energizable at a predetermined voltage to complete a circuit operable to charge a capacitor through a diode rectifier in said circuit, and means operable to connect said capacitor in series with a second relay whereby said relay is energizable by a discharging of said capacitor, and switch contacts on said second relay closed upon energization of the relay and completing a circuit energizing the circuit breaker relay coil of the second alternator and placing the two alternators in parallel at a time when they are in phase and the voltage difference between them is substantially zero.

3. An automatic paralleling control for a pair of alternators comprising, a manually operated switch, a rectifier connected to corresponding single phases of two three-phase alternators by said switch, a first relay connected across said rectifier energizable to actuate a double throw switch completing a circuit allowing the charging of a condenser connected across said rectifier, and a second relay connected to the open contact of said switch energizable by the discharge of said condenser when said first relay is de-energized, to close a second switch completing a circuit energizing the circuit breaker relay coil of the second alternator and paralleling said two alternators at a moment when they are in phase and there is substantially zero voltage between them.

4. An automatic control for paralleling two alternators comprising, a first relay energizable by a predetermined resultant voltage between corresponding phases of two alternators, a condenser chargeable during the energization of said first relay, a second alternator circuit breaker relay for paralleling the two alternators when they are in phase, and a second relay operable by the discharge of said condenser for energizing said second alternator circuit breaker relay.

5. A circuit for automatically paralleling two alternators when they are in phase comprising, a manually operated switch, a bridge type rectifier in series with a voltage reducing element connected by said switch to two corresponding terminals of two three-phase alternators such that the voltage across said rectifier is a sinusoidal voltage of varying magnitude, a first relay connected across said rectifier energizable at a predetermined voltage for different periods of time, said periods of time varying with the difference frequency between said two alternators, said relay being energized for the maximum period of time when said difference frequency is zero, a set of contacts on said relay closed during the energization of said relay and completing a circuit, a capacitor in said circuit chargeable through a rectifier to voltages varying with the length of time said first relay is energized, a second set of contacts on said first relay closed when said first relay is de-energized completing a circuit allowing said capacitor to discharge through a second sensitive relay in a discharge circuit which relay is energizable only when said capacitor has been allowed to charge to a predetermined value, so that said second relay is only energizable when said difference frequency between said two alternators is less than about 2.5 C. P. S., and a set of contacts on said second relay closed by the energization of said second relay completing a circuit energizing the second alternator circuit breaker relay which closes contacts paralleling the two alternators, said first relay being de-energized slightly before the voltage between the two alternators reaches zero, such that the time for said voltage to reach zero is equal to the sum of the time constants of said second relay and said second alternator circuit breaker relay whereby the alternators are paralleled when they are in phase.

6. A circuit for automatically paralleling alternators comprising, a manually operated switch, a full wave, bridge type rectifier connected across corresponding terminals of two three-phase alternators by said switch, means operable to substantially reduce the voltage across said rectifier, a first relay connected across said rectifier energizable at a predetermined voltage to complete a circuit, a capacitor chargeable through a diode rectifier in said circuit, contact means on said first relay operable by the de-energization of said first relay to complete a circuit allowing asid capacitor to discharge, a second sensitive relay in said discharge circuit energizable by said discharge only if said capacitor has been allowed to charge to a predetermined value through energization of said first relay for a predetermined length of time, said time varying inversely with the difference frequency between the two alternators, such that said second relay will be operable only when said two alternators are operating at approximately the same frequency, and switch contacts on said second relay closed upon energization of said relay to complete a circuit closing the circuit breaker relay of the second alternator and placing the two alternators in parallel at a time when they are substantially in phase.

7. An automatic paralleling control for a pair of alternators comprising, a manually operated switch, a rectifier connected to corresponding single phases of two three-phase alternators by said switch, a first relay connected across said rectifier energizable to close one set of contacts of a double throw switch completing a circuit allowing the charging of a condenser connected across said rectifier, a second relay connected to the other set of contacts of said switch closed by the de-energization of said first relay putting said relay in series with said charged condenser, said second relay energizable by the discharge of said condenser only if said condenser has had time to charge to a predetermined voltage which varies inversely with the difference frequency between the two alternators, and contacts on said second relay closed by energization of said second relay to complete a circuit energizing the circuit breaker relay coil of the second alternator and paralleling said two alternators.

8. A control for automatically paralleling two alternators comprising, a first relay energizable by a predetermined resultant voltage between corresponding phases of two alternators, a condenser chargeable during the energization of said first relay to values varying with the difference frequency between the two alternators, a second alternator circuit breaker relay for paralleling the two alternators when they are in phase, and a second relay operable by the discharge of said condenser from a predetermined value to energize said second alternator circuit breaker relay.

9. An automatic control for paralleling two alternators comprising, a relay energizable by a predetermined resultant voltage between two alternators, a condenser chargeable during the energization of said relay, and a circuit energizable by the discharge of said condenser for paralleling the two alternators when they are in phase.

10. An automatic control for paralleling two alternators comprising, a relay energizable by a predetermined resultant voltage between corresponding phases of two alternators for different periods of time, said periods of time varying with the difference frequency between said two alternators, a condenser chargeable during the energization of said relay to voltages varying with the length of time said relay is energized, and a circuit energizable by the discharge of said condenser from a predetermined voltage for paralleling the two alternators when they are in phase.

References Cited in the file of this patent

UNITED STATES PATENTS

| | | |
|---|---|---|
| 2,675,491 | Milne | Apr. 13, 1954 |
| 2,675,492 | Milne | Apr. 13, 1954 |
| 2,689,919 | Lytle | Sept. 11, 1954 |